Patented Dec. 27, 1932

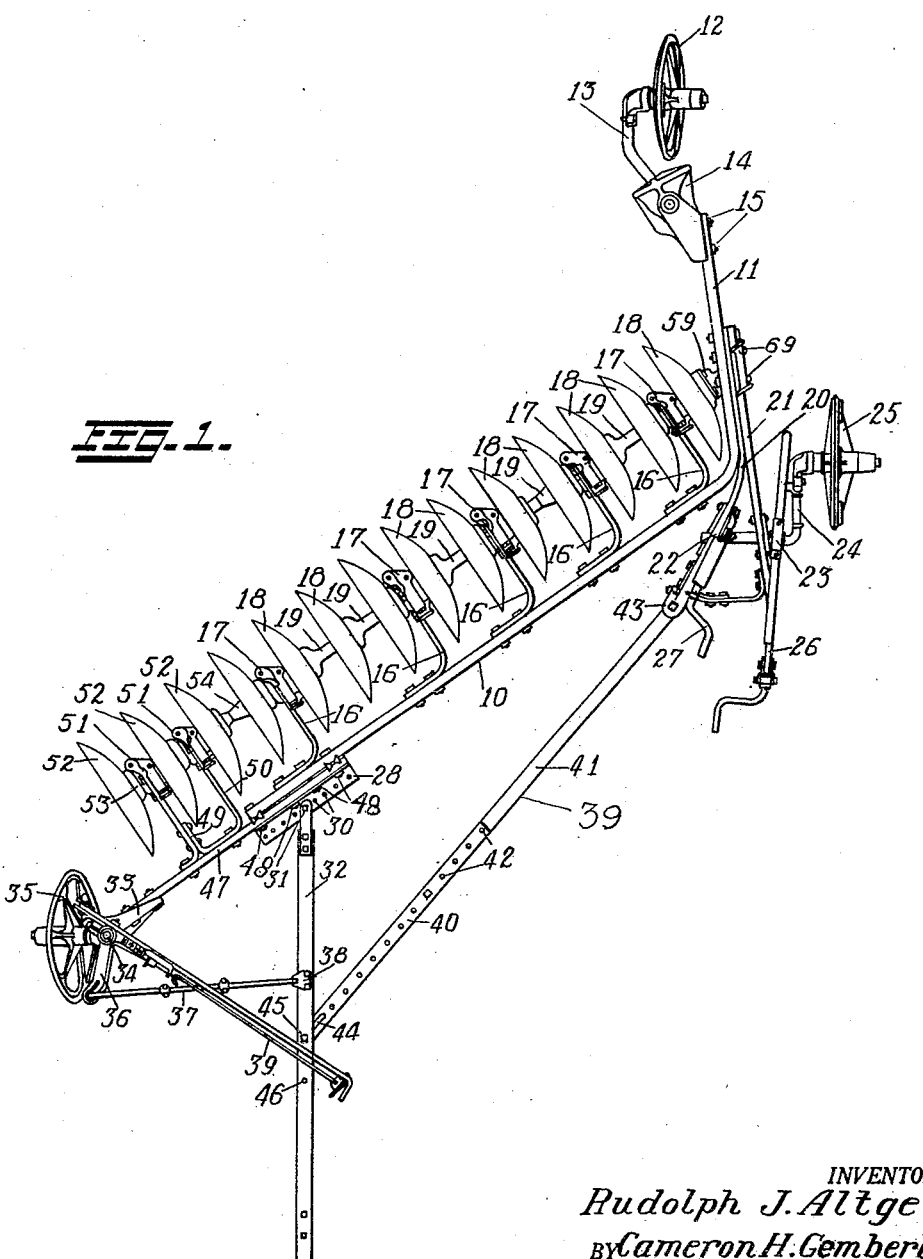

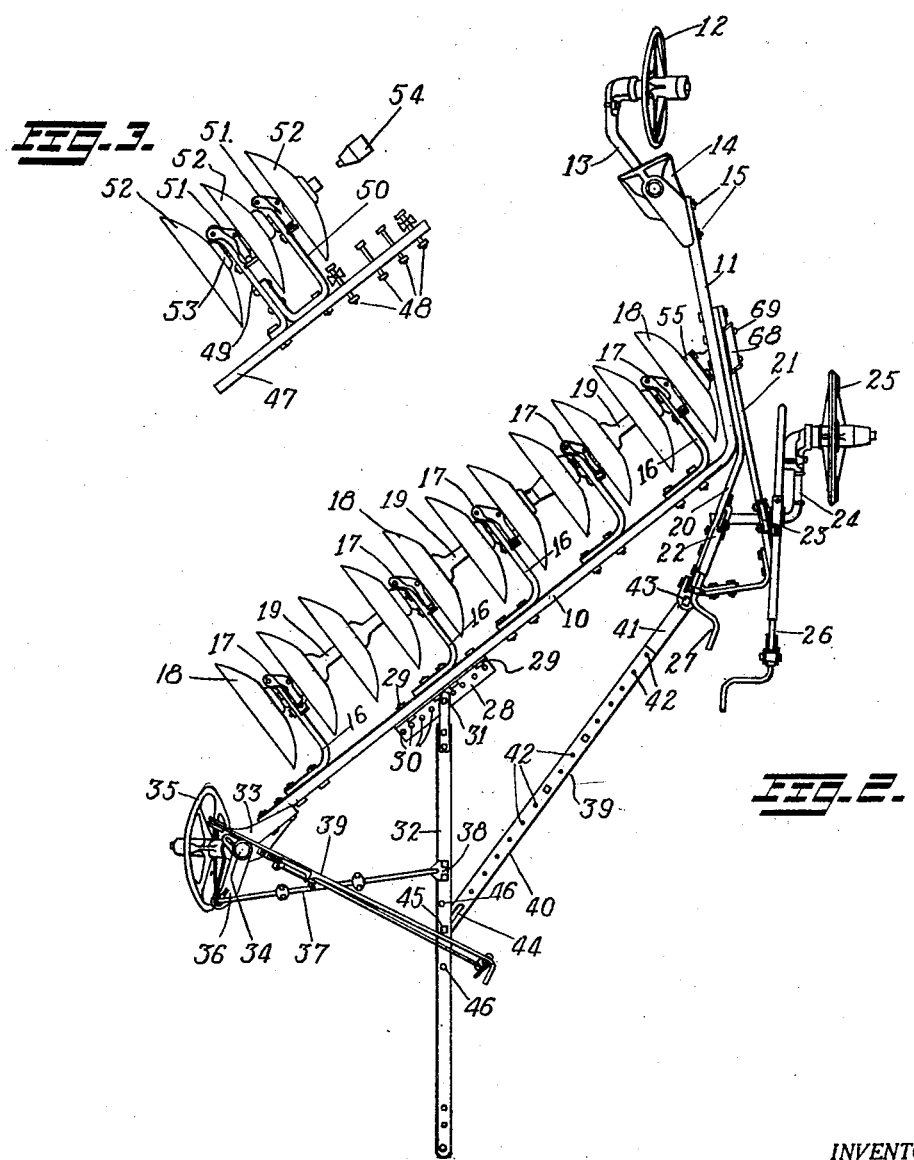

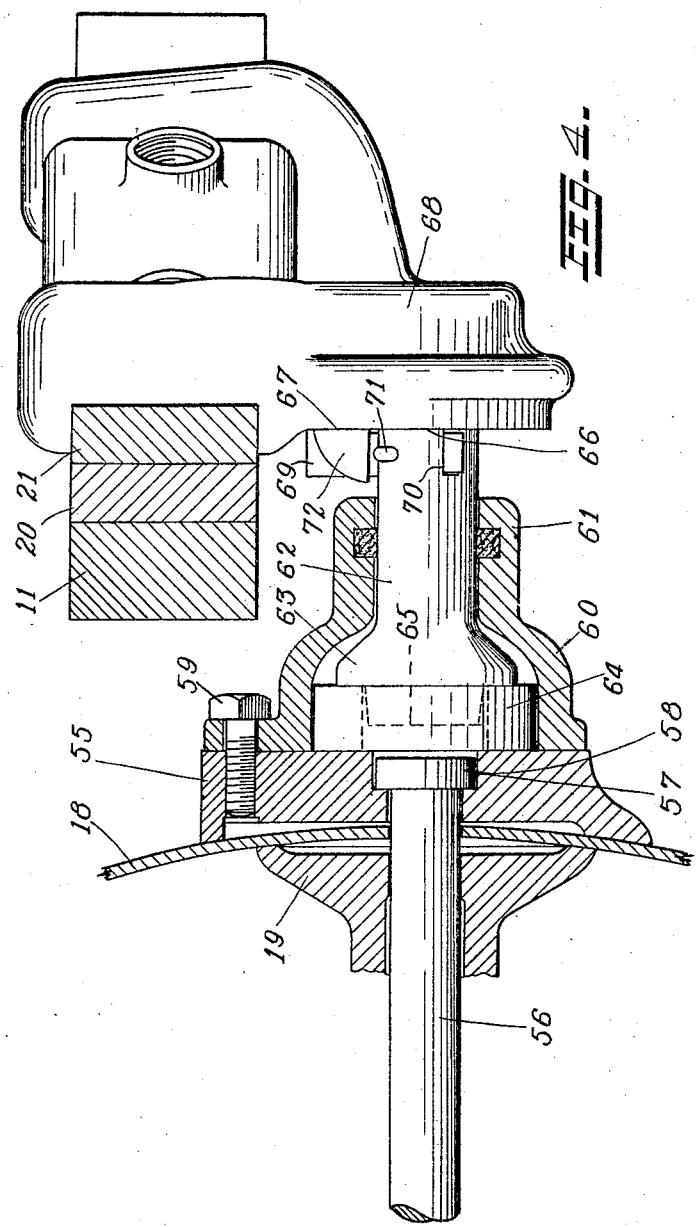

1,892,199

UNITED STATES PATENT OFFICE

RUDOLPH J. ALTGELT AND CAMERON H. GEMBERLING, OF SOUTH BEND, INDIANA, ASSIGNORS TO OLIVER FARM EQUIPMENT COMPANY, A CORPORATION OF DELAWARE

ONE-WAY PLOW

Application filed June 5, 1930. Serial No. 459,311.

The present invention is directed generally to plows and more particularly to a type of plow known as the "one way plow".

One of the objects of the present invention is to provide a novel and improved one way plow construction in which the side draft thereof is reduced to a minimum.

A further object of the invention is to provide a novel and improved one way plow in which the rear end of the primary draft member is permitted to be adjusted laterally with respect to the plow beam, so as to adapt the plow to different soil conditions.

A further object of the invention is to provide a novel and improved one way plow in which a connection is provided between the front furrow wheels directly to the main draft member of the plow for controlling and guiding the plow proper.

A still further object of the invention is to provide a novel and improved form of one way plow in which a lost motion guide member forms the connection between the land side of the plow and the main draft bar.

A still further object of the invention is to provide a novel and improved form of one way plow in which a forward section or unit may be removed from the plow proper and the furrow wheel moved inwardly and secured to the beam proper, to replace the removed unit, with the least amount of labor and effort on the part of the operator in making the change.

A still further object of the invention is to provide a novel and improved form of a floating end thrust bearing for the one way plow in which all the thrust is taken from the disc on a single bearing.

These and other objects are accomplished by providing a construction and an arrangement of the various parts in a manner hereinafter described and particularly pointed out in the appended claims.

Referring to the drawings:

Fig. 1 is a top plan view of our improved one way plow in which the removable section is positioned in its operative position with the rest of the plow proper;

Fig. 2 is a top plan view of our improved one way plow with the section removed;

Fig. 3 is a top plan view of the removable section; and

Fig. 4 is an enlarged cross sectional view taken on a vertical plane parallel to the gang bolt showing our improved form of floating thrust bearing.

In illustrating one form of our invention, we have shown the same as comprising a diagonally disposed main plow beam 10 having a rearwardly and longitudinally extending portion 11. The rear end portion 11 of the beam 10 is supported by a rear wheel 12 mounted on an axle 13 which in turn is adjustably secured to a casting 14. The casting 14 is secured to the rear end of the beam 11 by means of bolts 15. Secured to the rear side of the main plow beam 10 are a plurality of spaced apart L-shaped brackets or hangers 16. Secured to the hangers 16 in any well known manner are a plurality of bearing supports 17. Mounted in these bearing supports are the conventional form of wood bearings which carry the radial load of the plow of this type and are preferably made with considerable play so the discs will revolve freely. Mounted within the spaced apart bearings is a gang bolt 56 on which is revolvably mounted a plurality of discs 18 held in proper spaced relation with respect to each other by disc spacers 19. Secured to the outer side of the rearwardly extending portion 11 of the beam 10 are two forwardly diverging frame members 20 and 21. Secured adjacent the forward ends of each of the frame members 20 and 21 are two brackets 22 and 23 respectively, in which is adjustably mounted a land wheel crank axle 24. Mounted on the forward end of the frame member 21 is an adjusting screw 26 for adjusting the position of the land wheel 25 with respect to the plow for elevating or lowering the plow with respect to the ground. The inner end of the crank axle 24 may be adjusted by means of a crank screw 27 for controlling the angular position of the land wheel with respect to the plow. The specific construction of this land wheel adjustment per se, forms no part of the present invention except in combination with the other parts hereinafter described. For that reason it is believed that a more detailed description of the same is unnecessary.

Referring to Fig. 4 we have provided an angle bracket 28 secured to the forward side of the diagonally extending portion of the beam 10 at a point slightly forward of the center thereof which is secured thereto by means of bolts 29. The horizontal portion of this bracket 28 is provided with a plurality of apertures 30 so that the pivotal end, as shown at 31, of the draft member 32 may be laterally adjusted in these various apertures 30 for changing the normal angular position of the draft beam with respect to the draft member. Secured to the forward end of the main plow beam 10 is a furrow wheel bracket 33 in which is swiveled a furrow wheel axle 34. Journaled on the angularly extending portion of the axle 34 is a furrow wheel 35. Secured to the vertical portion of the upper end of the axle 34 is a crank 36 which has its free end connected by an adjustable connecting rod 37 to a bracket 38 secured substantially in the center of the draft bar 32. The forward end of the plow beam 10 is adjustable vertically with respect to the furrow wheel 35 by hand lever adjusting mechanism generally indicated by the reference character 39. This adjusting mechanism is of any well known construction for regulating the depth of penetration of the discs into the ground. The rear end of the beam 10 is connected to the draft member 32 by means of an adjustable lost motion connection generally indicated by the reference character 39. This connection 39 comprises two adjustable bars 40 and 41 which in turn are provided with a plurality of spaced apart apertures 42 for lengthening or shortening the connection. The rear end of the member 41 is pivotally connected as shown at 43 to the forward end of one of the forwardly diverging frame members 20 and the forward end of the member 40 is connected to the draft member 32 by means of slotted aperture 44 which engages a bolt 45 in the intermediate portion of the draft member 32. The slotted end 44 of the connection 40 may be connected in various positions with the draft member 32 so that the various apertures 46 provided in the draft member 32 so that the normal angular working position of the discs with respect to the draft member 32 may be changed in accordance with the different requirements found in the soil.

From the above description it will be readily seen that by pivotally connecting the rear end of the draft member directly to the plow beam and permitting its lateral adjustment with respect thereto, together with a direct connection from the furrow wheel to the primary draft member as well as the loose connection from the primary draft member to the rear end of the plow beam, that we have provided a novel and improved means as well as an efficient one, which will reduce to a minimum the side draft that is encountered with this type of plow and at the same time have provided a draft connection with its associate parts so that the angle of the plow with respect to the draft connection may be adjusted to meet the various requirements encountered in different soil conditions. It will be further noted that the slotted connections afforded by the slotted aperture 44 in the connecting bar 39 permits the plow to be turned on a relatively short turn to the left.

Another important feature of the present invention is directed to the removal of the unit or section in the form of three discs and an extension beam from the front end of the plow for reducing the number of discs and thereby the size of the plow for certain soil conditions or for the purpose of using a lighter draft appliance. The advantage of this arrangement, that is of removing the section from the forward end of the plow, is that the forward end of a one way plow is much lighter than the rearward end and is therefore, less burdensome in lifting the weight to make the change, than is required with the conventional form of one way plow heretofore used, where the section is removed from the rear end of the plow. This removable section comprises an extension beam 47 which is adapted to be removably secured to the forward end of main beam 10 by means of bolts 48. Secured to the rear side of the extension beams 47 are hanger brackets 49 and 50, the former being an L-shaped member and the latter being a substantially U-shaped member. Mounted in the rearward ends of these hangers 49 and 50 are bearing supports 51 which support the conventional form of wood bearings and have journaled therein the usual gang bolt (not shown) which in turn supports the three discs 52. The discs 52 are held in relatively spaced relation by the usual spacer collars or brushings 53. Positioned between the last disc 52 of the three discs and a first disc 18 of the main plow, is a special spacer collar 54 which is for the purpose of connecting the removable section to the main plow section. It will of course, be understood that when the section is positioned in the position shown at Fig. 1, the furrow wheel bracket 33 is secured to the forward end of extension beam 47 in the manner disclosed clearly in Fig. 1 and the angle bracket 28 is moved forwardly so as to properly position the draft bar 32 with respect to the plow proper when the extension is added to the plow. At the same time, it will of course be understood that the loose connection member 39 is adjusted so that the members 40 and 41 extend to the proper distance for connecting the draft bar 32 with the diverging frame extension 20.

From the above description it will be readily seen that by making the section removable from the front end we have made it very convenient and a less burdensome construction to make the change.

Another essential feature of the present invention has to do with a novel form of a floating end thrust bearing which sustains the whole lateral thrust exerted by all the discs of the disc plow. The specific embodiment of this feature of the invention is disclosed in Fig. 4 of the drawings and comprises a block 55 secured to the rearmost disc 18 through the medium of the gang bolt 56. The head 57 of the gang bolt 56 is seated in a recess 58 formed in the block 55. Secured to the block 55 by means of bolts 59 is a bell shaped bearing housing 60. Formed integrally with the housing 60 is a bearing portion 61 in which is journaled a shaft 62. The inner end of the shaft 62 is enlarged as shown at 63. Positioned between the enlarged portion 63 of the shaft 62 and the rear surface of the block 55 is an anti-friction roller bearing generally indicated by the reference character 64. Formed on the forward end of the enlarged portion 63 of the shaft 62 is an annular projecting lug 65 which is adapted to fit in the recess formed in the roller bearing 64 for maintaining the roller bearing in axial or concentric position with respect to the shaft 62. The rearward end of the shaft 62 projects rearwardly through the bearing 61 of the housing 60 and is adapted to have its rearward surface as indicated by the reference character 66 contact with the forward vertical surface 67 of an end thrust bracket or casting 68 which in turn is rigidly secured by means of bolts 69 to the rearwardly extending portion 11 of the beam 10 and the frame members 20 and 21.

From the above description it will be understood that the rearward end of the shaft 62 merely contacts with the surface 67 of the bracket 68 and that this surface 67 of the bracket 68 lies in a plane at right angle to the axis of the shaft 62 and the rearward end of the shaft 62 merely slides or floatingly contacts with the flat surface 67 of the bracket and sustains the whole thrust of all the discs of the plow. In order to prevent the shaft 62 from revolving with the action of the revolving disc, we have provided a key or flat piece of steel which is inserted in an aperture 70 formed transversely in the rear end of the shaft 62. This key 69 is secured in the shaft by means of the pin 71. The free end of the pin or key 69 is adapted to engage a lug 72 formed integrally with and on the forward surface 67 of the bracket 68.

In the operation of the above described improved floating end thrust bearing for plows, it will be understood that the discs 18 of the plow revolve with the gang bolt 56 and that the thrust of all the discs is sustained by the roller bearing 64 contacting with the shaft 62 and the rearward end of the shaft 62 contacts with the vertical surface 67 of the bracket 68. It will of course be understood that the shaft 62 is prevented from revolving by reason of the key 69 contacting with the lug 72 formed integrally with the bracket 68. This floating construction of end thrust bearing permits the anti-friction bearing to always maintain its proper alignment with the axis of the revolving discs and prevents any cramping or disalignment of the bearing with respect to the disc shaft.

While in the above specification we have described one embodiment which our invention may assume in practice, it will of course, be understood that the same is capable of modification and that modification may be made without departing from the spirit and scope of the invention as expressed in the following claims:

What we claim as our invention and desire to secure by Letters Patent is:

1. The combination with a one way plow having a diagonally disposed beam, a plurality of discs secured rearwardly of said beam, a land wheel for supporting the rear end of said beam, a dirigible furrow wheel supporting the forward end of said beam, a draft member pivoted directly to said beam and operatively connected to said furrow wheel for forming the draft connection for said plow for controlling the direction of travel of the same and a floating end thrust bearing carried by the rearmost disc and movably related to said beam for sustaining the end thrusts of all of said discs.

2. The combination with a one way plow having a diagonally disposed beam, a plurality of discs secured rearwardly of said beam and parallel with respect thereto, wheel support for the rearward end of said beam, a dirigible furrow wheel secured to the forward end of said beam, a single draft member pivoted directly to said beam and operatively connected to said furrow wheel, and a lost motion connection connecting the land side of the beam with the draft member for forming the draft connection for said plow and controlling the direction of travel of the same.

3. The combination with a one way plow having a diagonally disposed beam, a plurality of revolving discs secured rearwardly of and parallel to said beam, wheel support for the rearward end of said beam, a dirigible furrow wheel secured to the forward end of said beam, a draft member pivoted directly to said beam, a connection connecting said dirigible furrow wheel to an intermediate portion of said draft member and a floating thrust bearing carried by one of said discs and movably related with respect to said beam for sustaining the thrusts of all of said discs.

4. The combination with a one way plow comprising a diagonally disposed beam, a plurality of spaced apart revolving discs secured to the rearward side of said beam, wheel support for the rearward end of said beam, a dirigible front furrow wheel secured to the forward end of said beam, a laterally adjustable draft member pivoted directly to said beam and operatively connected to said dirigible wheel for forming the draft connection for and controlling the direction of travel of said plow and a lost motion connection connecting the land side of said beam with said draft member.

5. A one way plow comprising a diagonally disposed beam, a plurality of discs supported by said beam rearwardly thereof, a draft member pivoted directly to said beam, wheel support for the rear end of said beam, a dirigible furrow wheel supporting the forward end of said beam, a connection connecting said furrow wheel with said draft member, means for laterally adjusting the pivoted end of said draft member with respect to said beam and a lost motion connection connecting the land side of the beam with said draft member.

6. A one way plow comprising a diagonally disposed beam, a plurality of discs secured rearwardly of said beam, wheel support for the rearward end of said beam, a dirigible furrow wheel supporting the forward end of said beam, a longitudinally extending draft member pivoted directly to said beam and operatively connected to said furrow wheel, and a lost motion connection connecting the rear end of said beam with said draft member.

7. A one way plow comprising a diagonally disposed beam, a plurality of spaced apart rotary discs mounted rearwardly of and supported by said beam, wheel supports for the rearward end of said beam, a dirigible front furrow wheel supporting the forward end of said beam, a draft member having its rearward end adjustable and pivotally connected directly to said beam and operatively connected to said dirigible furrow wheel, and an adjustable lost motion connection connecting the rear end of said beam with said draft member.

8. The combination with a one way plow, of a diagonally disposed beam, a plurality of discs journaled rearwardly of and supported by said beam, wheel support for the rear end of said beam, a dirigible wheel for supporting the front end of said beam, a draft connection connected to said beam and operatively connected to said dirigible wheel, and a removable section detachably connected to the forward end of said beam.

9. The combination with a one way plow comprising a diagonally disposed plow beam, a plurality of spaced apart rotating discs supported rearwardly of said beam, wheel support for supporting the rear end of said beam, a dirigible furrow wheel supporting the forward end of said beam, a draft connection pivotally connected to said beam and operatively connected to said furrow wheel, and a removable plow section adapted to be secured to the forward end of said beam and to said furrow wheel for enlarging the size of said plow.

10. The combination of a one way plow having a diagonally disposed main beam, a plurality of spaced apart plow discs supported rearwardly of and by said beam, wheel support for the rearward end of said beam, a removable plow section comprising a beam extension adapted to be secured to said main beam, spaced apart discs mounted rearwardly of said beam extension, a dirigible furrow wheel adapted to be secured to said beam extension, and a draft member pivoted to said main beam and operatively connected with said dirigible furrow wheel for guiding and forming the draft connection for said plow.

11. The combination with a one way plow having a diagonally disposed plow beam, spaced apart rotating discs mounted rearwardly of and supported by said beam, wheel support for the rearward end of said beam, a dirigible furrow wheel for supporting the forward end of said beam, a draft member pivoted directly to said beam and operatively connected to said furrow wheel, and a removable plow section mounted between said beam and said furrow wheel for increasing or decreasing the size of said plow.

12. The combination with a one way plow, of a diagonally disposed main plow beam, a plurality of spaced apart discs positioned rearwardly of and supported by said beam, wheel support for the rearward end of said beam, a dirigible furrow wheel supporting the forward end of said beam, a removable plow section adapted to be secured to said main plow beam and said furrow wheel, a draft member pivoted directly to said main plow beam and operatively connected to said furrow wheel, and means for laterally adjusting the pivoted end of said draft member with respect to said plow beam.

13. The combination with a one way plow having a diagonally disposed plow beam, a plurality of spaced apart rotating discs positioned rearwardly of and supported by said beam, wheel support for the rearward end of said beam, a dirigible furrow wheel supporting the forward end of said beam, a removable plow section adapted to be secured between said beam and said furrow wheel, a draft member pivoted directly to said beam and adjustable laterally with respect thereto, said draft member being operatively connected with said furrow wheel, and an adjustable lost motion connection connecting said draft member with the rear end of said plow beam.

14. The combination with a one way plow having a diagonally disposed main plow beam, a plurality of spaced apart revolving discs located rearwardly of and secured to said beam, wheel support for the rearward end of said beam, a dirigible furrow wheel supporting the forward end of said beam, a laterally adjustable draft member pivotally connected directly to said beam and operatively connected with said furrow wheel, an adjustable lost motion connection connecting the rear end of said beam to an intermediate portion of said draft member and a removable plow section comprising a beam extension and a plurality of discs carried thereby, said section being adapted to be secured to the forward ends of said beam for increasing the size of said plow.

15. The combination with a plow, of a frame therefor having a plurality of spaced apart discs carried thereby, and a floating end thrust bearing carried adjacent the rearmost disc and movably related to the frame for sustaining the thrusts of all the discs.

16. The combination with a one way plow, of a frame therefor, a plurality of diagonally disposed beams mounted in said frame, an end thrust bearing carried adjacent said rearmost disc and movably related to said frame for sustaining the end thrust on all of said discs.

17. The combination with a one way plow, of a diagonally disposed beam having a plurality of discs supported thereby, a gang bolt on which said discs are mounted, an end thrust bearing secured rearwardly of the rearmost disc by said gang bolt, a thrust bracket secured to said beam, and a rearwardly extending non-rotatable shaft engageable with said bearing and contacting with said thrust bracket for sustaining the thrust of all of said discs.

18. The combination with a one way plow, of a diagonally disposed beam having a plurality of spaced apart discs carried thereby, a gang bolt for rotatably supporting said discs, a thrust bearing housing secured to the rear disc by said bolt, an anti-friction bearing mounted in said housing, a thrust bracket secured to said beam, and a non-rotatable shaft engageable with said anti-friction bearing and slidably related to said end thrust bracket for sustaining the lateral thrusts of all of said discs.

19. The combination with a one way plow, of a diagonally disposed beam support having a plurality of spaced apart rotating discs thereon, a gang bolt on which said discs are mounted, a block secured to the rear disc by said gang bolt, a bearing housing secured to said block, an anti-friction thrust bearing mounted in said housing and contacting with said block, a thrust bracket secured to said beam, a shaft extending into said housing and contacting on the forward side with said thrust bearing, the rearward end of said shaft slidably engaging said thrust bracket and means for preventing the rotation of said shaft with respect to said bracket.

In testimony whereof we have signed our names to this specification, on this 29th day of May, A. D. 1930.

RUDOLPH J. ALTGELT.
CAMERON H. GEMBERLING.